United States Patent [19]

Sibeud

[11] 4,324,322
[45] Apr. 13, 1982

[54] METHOD FOR THE AUTOMATIC CONTROL OF A GEARBOX, IN PARTICULAR ON A MOTOR VEHICLE

[76] Inventor: Jean-Paul Sibeud, Chaponnay, France

[21] Appl. No.: 946,508

[22] Filed: Sep. 28, 1978

Related U.S. Application Data

[63] Continuation-in-part of Ser. No. 594,571, Jul. 9, 1975, abandoned.

[51] Int. Cl.³ .................... B60K 41/28; B60K 41/04
[52] U.S. Cl. .................... 192/0.032; 192/0.092; 192/3.56; 192/3.61; 74/866
[58] Field of Search ........... 192/4 A, 0.033, 0.032, 192/0.03, 3.56, 3.55, 3.54, 3.51, 3.61, 3.63, 0.092; 74/866

[56] References Cited

U.S. PATENT DOCUMENTS

| | | | |
|---|---|---|---|
| 3,417,640 | 12/1968 | Schmidt et al. | 192/0.092 |
| 3,645,366 | 2/1972 | Numazawa et al. | 192/3.56 |
| 3,667,577 | 6/1972 | Weymann | 192/0.092 |
| 4,033,202 | 7/1977 | Ahlen et al. | 192/4 A |
| 4,079,638 | 3/1978 | Sibeud | 74/866 |
| 4,140,031 | 2/1979 | Sibeud et al. | 74/866 |
| 4,148,231 | 4/1979 | Redzinski | 74/866 |

Primary Examiner—George H. Krizmanich
Attorney, Agent, or Firm—Irving M. Weiner; Pamela S. Burt; John L. Shortley

[57] ABSTRACT

A manual or automatic control method for the gearbox of a vehicle by use of an electronic computer.

The electronic computer controls the clutch and the dogs of the gearbox:
 either through the manual intervention of the driver,
 or in the event of a "kick down" of the accelerator pedal,
 or else automatically on the initiative of a processing device 300. The method permits automization of a standard gear box, which can also be supplied in non-automatic form.

22 Claims, 2 Drawing Figures

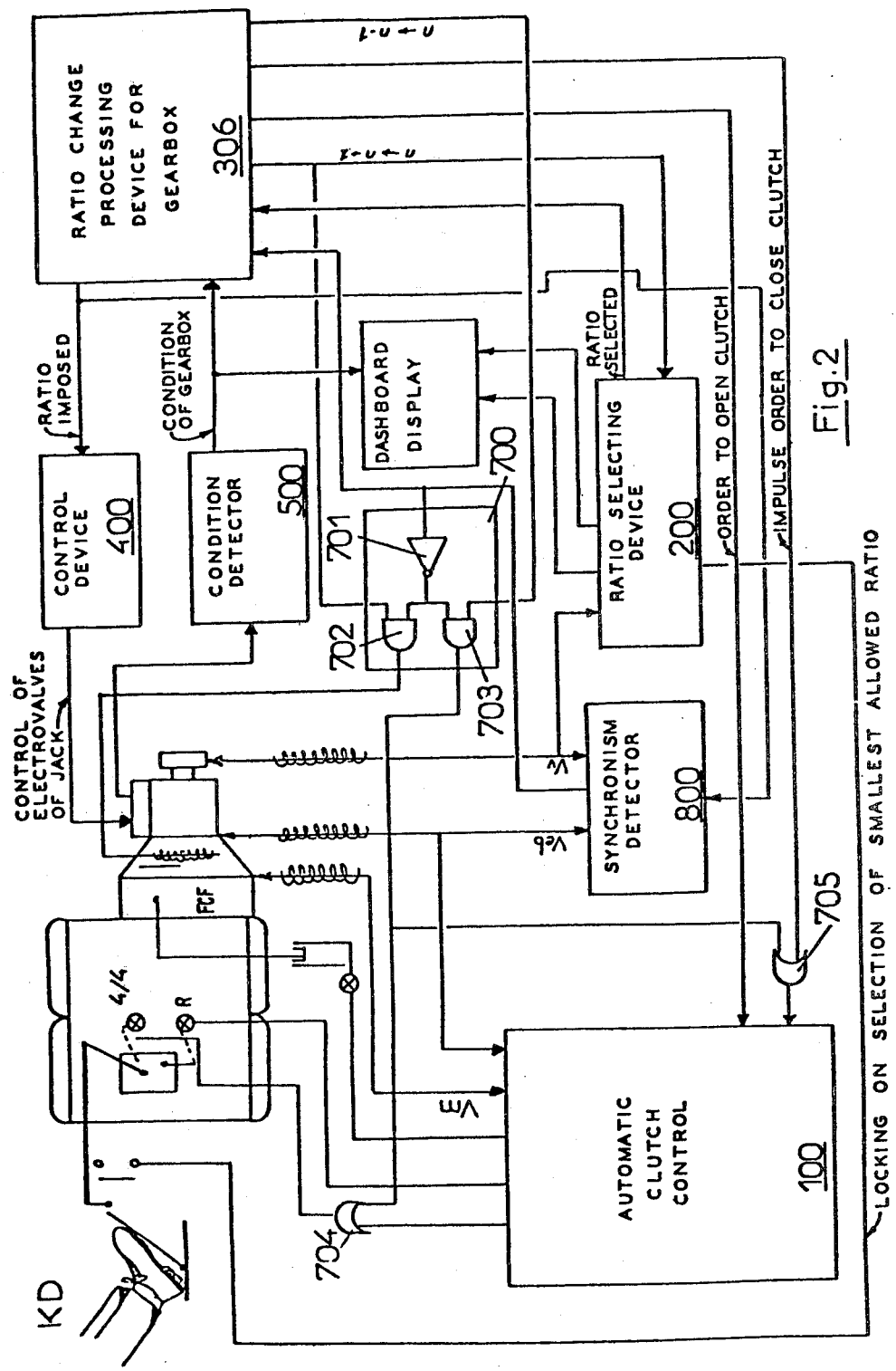

METHOD FOR THE AUTOMATIC CONTROL OF A GEARBOX, IN PARTICULAR ON A MOTOR VEHICLE

This is a continuation-in-part of application Ser. No. 594,571 filed July 9, 1975 and now abandoned.

The present invention relates to a novel method and apparatus for automatizing the control and changing of gears in a motor vehicle, in particular, a lorry or truck.

BACKGROUND OF THE INVENTION

The method and apparatus according to the invention is different from the systems generally known as "automatic drive", which include a gearbox especially designed for automation, such as, for instance, a box with epicycloidal gears, provided with electromagnetic brakes or clutches, and associated with a torque converter or hydraulic coupling means. On the contrary, the present invention aims at automatizing a gearbox of conventional type, the changes in reduction ratios of which are obtained by shifting dogs which are generally controlled by sliding forks.

SUMMARY OF THE INVENTION

An object of the invention is thus to automatize the gear changing operations which are usually manually controlled by the driver of the vehicle, viz.:
 the decision of changing of gear by increasing or reducing a ratio;
 the disengaging operation;
 the putting into neutral; and
 the engagement of the dogs of a new gear ratio.

Furthermore, the invention aims at providing safety means, that is, preventing incorrect or improper handlings (risk of exceeding the normal working conditions if the ratio is being reduced incorrectly or improperly, and the like).

Lastly, the invention aims at removing a hitch which occurs often in the conventional gearboxes, viz., upon the start of the vehicle it is sometimes impossible to interlock two dogs because at that very moment the dogs happen to be lying with their teeth opposed.

The method according to the invention allows therefore the automation of a conventional gearbox, merely by replacing the cover of a standard gearbox by a cover with means according to the invention. This offers a double advantage, by allowing:
 the automation of vehicles which are already in use; and
 as regards the production of new vehicles, the provision by the manufacturer of only one type of gearbox which will then be fitted, on request, either with a hand control cover, or with an automatic control cover.

The present invention provides a method for controlling and/or equipping a gearbox provided with dogs on a vehicle including an engine, a clutch, members and controls, characterized in that it carries out automatically and through electronic circuits the following operations:
 (a) opening the clutch;
 (b) putting the gearbox into neutral;
 (c) memorizing or storing the code of a new gear ratio $n'$ selected (which ratio becomes then the "imposed ratio"), and simultaneously storing the data relating to the character of the change of reduction ratio (progression or regression);
 (d) as soon as the gearbox has reached the neutral position, engagement of the new ratio $n'$ by the control device for the box;
 (e) using a detector of condition, which indicates that the gearbox is now in the condition $n'$ (that is, the dogs of the gear ratio $n'$ are meshed together);
 (f) simultaneously closing of the clutch;
 (g) operation of a comparator of the ratio change processing device which detects the equivalence between the ratio selected and the ratio indicated by the position of the gears or shifting rods of the gearbox; and
 (h) cancelling the order to change gears, and removing the storing of the data so that the device is ready to start a new cycle.

The selection of a new ratio $n'$ at the beginning of a cycle can be made:
 either manually by the driver,
 or on the initiative of the driver whose foot depresses the accelerator pedal in the so-called "kick down" process;
 or else automatically, on the "initiative" of a processing device of a known type, which starts in particular when the working conditions of the engine tend to fall below a predetermined limit, or when the torque supplied by the engine decreases beyond a certain threshold.

It will be noted that the method according to the invention allows the automation of both a gearbox the dogs of which have individual synchromeshes, and a gearbox provided with a collective synchromesh constituted, for instance, by an eddy-current brake.

In the case of a gearbox with individual synchromeshes, the method according to the invention is characterized in that it provides for the reception of a permit to carry out the change of ratio, while the absence of such permit would stop the development of the cycle immediately after the gearbox is put into neutral.

In the case of a gearbox with a collective synchromesh, the method according to the invention is characterized in that the above method proceeds till the gearbox is at neutral, after which the synchronization is brought about:
 either by accelerating the engine, the clutch being closed in the case of a regression (the speeds are "lowered", and this operation produces so-called "double declutching"),
 or by the action of the collective synchromesh or eddy-current brake, the clutch being open in the case of a progression (the speeds are "raised", and this step produces "double pedalling").
until the detector of synchronism authorizes the cycle to be carried on.

According to another feature, the process according to the invention allows the driver to work:
 either with automatic operation (in which case the gear changing operations start by themselves, regardless of the will of the driver),
 or with semi-automatic operation (that is, the gear changing operations start on the initiative of the driver, who gives a starting impulse, but then proceeds fully automatically after said impulse is given).

According to another feature of the invention, when the foot of the driver depresses the accelerator pedal for the operation known as "kick down", it is found that:
 (a) with the semi-automatic operation, this action is followed by no effect; or (b) with the automatic operation, on the other hand, this starts the following operations:

I. The "ratio selecting device" receives the order to select the smallest allowed ratio, and emit it as "selected ratio n'";

II. Said order is fed to the comparator, after which the method proceeds as described hereinabove, that is, either the cycle is carried on by an operation where gear ratio is automatically retrograded, or the cycle stops.

If the driver depresses the accelerator pedal fully, this kick down, even fleeting, is acted upon to reduce the gear ratio to the smallest ratio useable at the current vehicle speed, so that, even if the driver releases the accelerator pedal, the "retrograded" ratio remains geared and this allows restraining the vehicle through the braking action of its engine, and this improves safety.

According to another feature of the invention, the selection of the smallest allowed ratio (kick down stroke) can be removed only:

(a) if the engine has reached working conditions such that a predetermined point on the slope of the cut-off curve of the maximum speed regulator of the engine is reached (which points represents the rotational speed of the engine at which it is no longer capable of producing acceptable torque).

(b) or if the acceleration of the vehicle exceeds a predetermined threshold.

According to another feature of the invention, the predetermined rotational speed point on the cut-off curve defined by the regulator of the engine lies substantially in the middle of said curve, that is, substantially for speed of rotation of the engine which is the arithmetical mean between the rotational speed at the beginning of the cut-off and the conditions at the end of the cut-off, and represents an engine speed at which said engine is capable of producing about one-half of its maximum torque.

It will be noted that in any case the process of operation of the kick down according to the invention applies both to gearboxes with individual synchromeshes, and to gearboxes with collective synchromeshes, the well known differences between these two types of gearboxes being explained below.

In a gearbox with individual synchromeshes, each gear ratio has its own synchromesh. Such synchromesh is commonly of the mechanical type, with synchronization of the parts before meshing being achieved by means of small frustoconical clutches. The driven gear may be, if necessary, either slowed down or accelerated with respect to the output shaft by the synchromesh.

In a gearbox with collective synchromesh, each gear ratio does not have its own synchromesh, but rather the gears have only simple meshes. The driven gears may be synchronized with the output shaft in the following alternative ways: (1) An intermediate shaft brake for slow-down of the gears (for example, member 57 shown in FIG. 1 of U.S. Pat. No. 3,756,358, or member 60, shown in FIG. 1 of U.S. Pat. No. 3,834,499); or (2) A common clutch for providing a faster rotary motion to the intermediate shaft by accelerating the engine (double declutching action). Detection of the synchronism is achieved by a mechanical system (a bolt which is released when synchronism has been reached), or a more complicated system generally of an electronic type. With this latter system, automatic shifting of the gear ratios is easily achieved.

BRIEF DESCRIPTION OF THE DRAWINGS

FIG. 2 is a similar view, in the case of a gearbox with a collective synchromesh.

DETAILED DESCRIPTION

Figure 1:
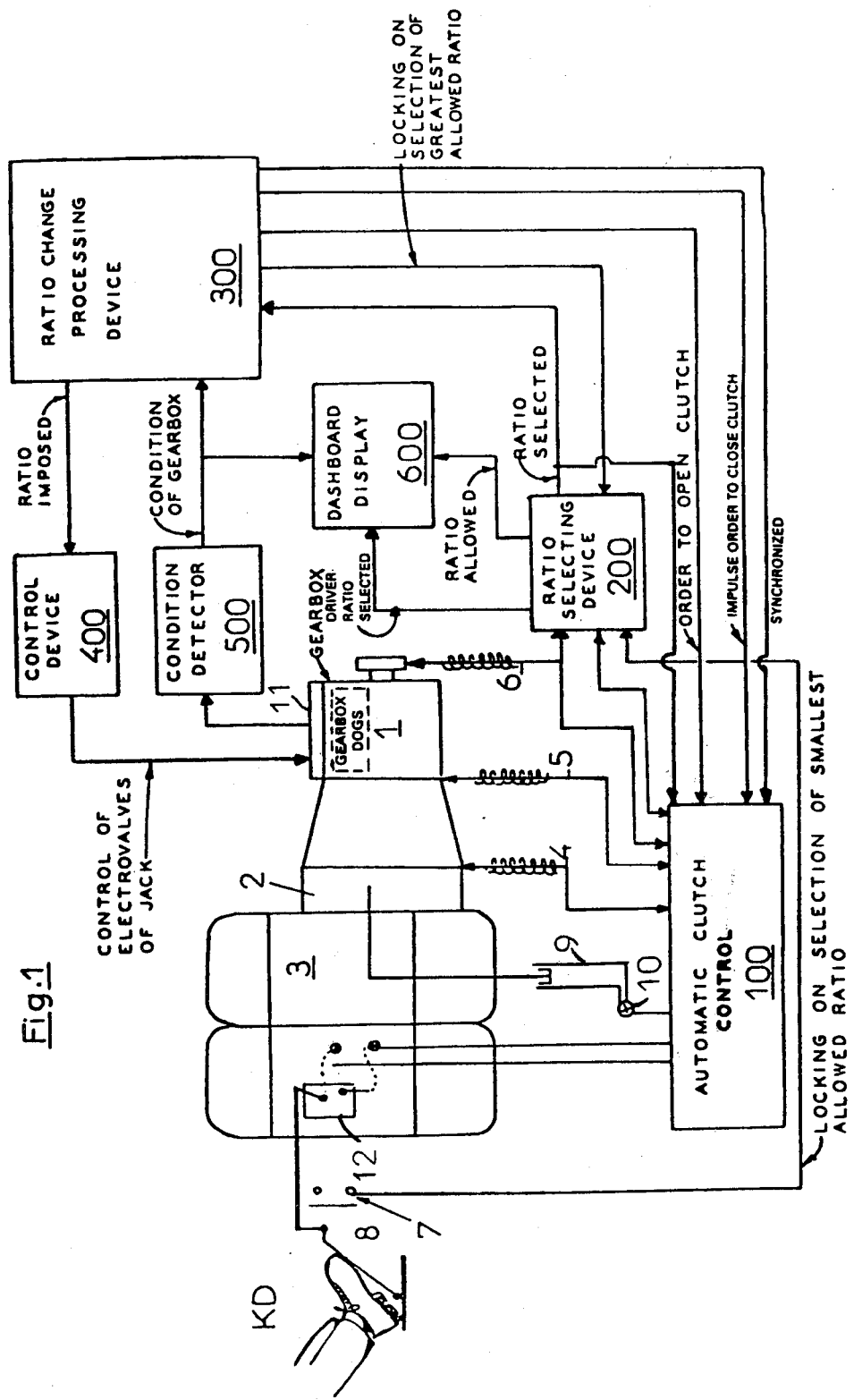
FIG. 1 is a diagrammatic illustration of the system according to the invention used for automatizing a gearbox with individual synchromeshes.

With reference to FIG. 1, a gearbox 1 is illustrated connected to an engine 3 through a clutch 2.

The gearbox 1 may be of a conventional type. Each reduction gear may have its own synchronization device.

The clutch 2 may be of the conventional type or of the automatized type, having an integral jack and/or electrovalve and jack.

A device 100 is an electrical device identified as an automatic clutch control, and can be constructed of commercially-available components, including: devices for ensuring proper functioning of sensors 4 and 5; devices for linearizing the sensor outputs as frequency to voltage converters, comparators connected so as to determine whether engine speed must increase or decrease in order to match the engine speed to the gearbox speed during the gear-shift operation; devices to control the electrovalves which vary engine speed from logic-level signals; devices to energize electrovalve 10; a differentiator to convert the output of sensor 6 into an electrical signal proportional to vehicle acceleration; and Schmitt-trigger type circuits to predetermine upper and lower limits on engine rotational speeds and limits on vehicle acceleration.

A device 200 is provided for selecting the speed ratio, either automatically, or by hand control. The device 200 is an electrical device, the operation and circuitry of which is clearly described in U.S. Pat. No. 4,079,638.

A processing device 300 is provided to initiate the change of ratio. The device 300 is an electrical device, the operation and circuitry of which is clearly described in U.S. patent application Ser. No. 563,377 filed Mar. 31, 1975, allowed on Apr. 10, 1978, and now U.S. Pat. No. 4,140,031.

A device 400 controls, through jacks, the gear change members of the gearbox (for instance, the sliding motion of the control forks for the dogs). The device 400 is an electrical device, with a device comparable thereto being clearly disclosed in French Pat. No. 2,233,892, and may be practiced either in the manner set forth therein, or by any other device utilizing commercially available components to accept a 4-digit binary code representing a desired gear ratio, and energize an appropriate combination of electrovalves of gearbox control device 11 to cause jacks mounted so as to control the gearbox dogs or shifting forks to position the gears to the desired ratio.

A detecting device 500 detects the condition of the gearbox, that is, that reduction ratio which is in gear at the moment considered. The device 500 is clearly described as to both its operations and its circuitry in U.S. Pat. No. 3,943,792. This device produces a binary representation of the gear ratio represented by the positions of internal sliding gear selector rods of the gearbox which carry the shifting forks, and may also be practiced in the manner known to the prior art, using individual electrical switches for each gear ratio. It is mounted to the inside of the gearbox cover.

A device 600 provides a display of the gear ratio currently engaged for the information of the vehicle operator, and is also intended to incorporate means by which the vehicle operator may select a gear ratio in semi-automatic mode, and also allow operator selection of semi-automatic or automatic modes. The display can be constructed from commercially-available components, accepting a binary representation of current gear ratio, and presenting an appropriate display in numerical or "1-of- n" format using an appropriate commercial display driver. A commercially-available rotary selector switch with binary outputs may be used to advantage for input of the gear ratio desired by the vehicle operator. This device is also intended to inform the operator that a manually-selected gear ratio is not useable with the existing vehicle speed, and is not being implemented, by means of an illuminated display device.

The system also includes:
- a sensor 4 for sending the speed of the engine 3 at the output shaft of the engine;
- a sensor 5 for the speed of the input shaft of the gearbox;
- a sensor 6 for the speed of the vehicle, or the speed of rotation of the propeller shaft of the vehicle or the speed of rotation of the output shaft of the gearbox;
- an overstroke contact 7, disposed under the accelerator pedal 8 for the control of a "kick down" KD.

The actuating members of the system are as follows (as they are of a conventional type, they are not shown in the drawing);
(a) for the control of the clutch, an electrovalve 10 and a jack 9 are provided;
(b) for correcting the speed of the engine, a fuel injection pump or throttle control device 12, composed of two jacks and two electrovalves is used to position the control lever of the fuel injection pump or throttle irrespective of the position of accelerator pedal 8.

The exact arrangement of these devices depends on the particular features of the engine. However, it is anticipated that one of the two three-way pneumatic electrovalves, when energized, will cause the jack to increase the engine speed, and the other said electrovalve will cause a decrease in engine speed. The engine speed control device 12 incorporates any conventional method of preventing interference with its operation by operation of pedal 8, such as a spring-override mechanism, or a solenoid-operated disengagement mechanism.
(c) for controlling the forks and dogs of the gearbox, there are two solutions:
  either a cover with pneumatic jacks is mounted on the box to implement gearbox control device 11, directly actuating the shifting forks of the gearbox.
  or an actuating system of any known type is mounted instead of the conventional manual control rod linkage, using jacks exterior to the gearbox to actuate the shifting forks by the same means as used with manual control linkages.

The exact number of pneumatic jacks and associated electrovalves, and the arrangement thereof depends on the number of gear ratios available and the arrangement of the transmission. It is anticipated that one or more of the jacks will be of the conventional type having one or more pneumatically actuated internal stop pistons, so that the output shaft of said jack can assume three or more discrete positions to position the appropriate gearbox shifting means to three or more discrete positions. Conventional electrical switches actuated by the jack shafts may be used to indicate the jack shaft positions and therefore the gear ratio currently in effect, although the use of the device described in U.S. Pat. No. 3,943,792 is intended.

All the electronic components are grouped in an electronic computer, which contains:
- an automatic clutch control 100;
- the device 200 for selecting the ratio consistent with vehicle and engine speed limitations, either automatically or manually and memorizing said ratio and storing data relating to the nature of a gear ratio change (increased or decreased ratio) until gear shifting is completed;
- the processing device 300 for the change of ratio of the gearbox, comparing the gear ratio imposed with the condition of the gearbox, and placing the gearbox gears in position for initial engagement;
- the device 400 for controlling the dogs of the gearbox;
- the detecting device 500 for ascertaining the condition of the gearbox; and
- a display device 600 for display on the dashboard of the vehicle.

The operation is as follows:
The ratio selecting device 200 receives the indication of the speed of the vehicle, and directions from the driver, which directions vary depending on the mode of operation.

A—Semi-automatic operation:
The driver selects a ratio through manual selection. If said ratio is allowed for the speed of the vehicle at that time, a binary code corresponding to the ratio selected is emitted by device 200 towards the processing device 300, and the execution is immediate. If the ratio selected by the driver is incompatible with the speed of the vehicle as measured by sensor 6, the device 200 emits the binary code "0 0 0 0" which is never taken into account by device 300, and no change will occur until the selected ratio changes, or the speed of the vehicle reaches a value compatible with said ratio.

B—Automatic operation:
The driver chooses the automatic way, and chooses to use the greatest ratio allowed, or through a fleeting kickdown, the smallest ratio allowed, taking the speed of the vehicle into account. The selected ratio emitted by 200 towards 300 changes together with the speed of the vehicle and the will of the driver to use the smallest ratio allowed for maximum power and acceleration or to drive under economical conditions with the greatest ratio allowed.

The fleeting action of the kick down, which allows driving with the maximum power or to "retrograde," is memorized by device 200 until a higher ratio is reached, or until the acceleration of the vehicle exceeds a threshold which depends on the gear engaged.

The ratio change processing device 300 receives data from the ratio selecting device 200 and the device 500 which detects the condition of the gearbox. It controls the actions of the gearbox control device 400 and the automatic clutch control 100.

The automatic clutch control 100 ensures the control of the coupling at the start, and the openings and closings required for the changes of the ratios. Furthermore, during said changes, it places the engine speed under the control of the speed of the input shaft of the gearbox in order to reduce the closing shocks at the end of the ratio change cycle.

With reference to FIG. 1, the operation is as follows.

In a first hypothesis it will be assumed that a lower ratio n is set, so as to pass from the ratio or to the ratio n+x, corresponding to normal changing of gears as the vehicle accelerates, in automatic mode. Sensor 6 and device 200 detect vehicle speed by measuring the speed of the gearbox output shaft, and comparing it with a reference which changes as different gear ratios are engaged. This has the effect of measuring engine speed, and comparing the engine speed to the rotational speed at which it can no longer produce adequate torque. When the engine speed reaches that point, ratio selecting device 200 selects the gear ratio that will result in an engine speed no less than a predetermined value at the current road speed of the vehicle, usually n+1, and emits a corresponding binary code to device 300. Device 300 emits a signal to device 100, to open the clutch. Device 100 operates electrovalve 10, and jack 9 to open the clutch. Device 300 emits a binary code corresponding to a command to place the gearbox in neutral to control device 400, which energizes appropriate electrovalves to cause the jacks of gearbox control device 11 to place the gearbox in neutral. Condition detector 500 senses that the gears are in neutral and orders automatic clutch control 100 to close the clutch. Automatic clutch control 100 de-energizes electrovalve 10 and energizes an electrovalve of control device 12 to decrease engine rotational speed until the speeds of the gearbox input and output shafts, as measured by sensors 5 and 6 respectively, are related by a constant, at which time an electrical signal indicating the gearbox shafts are synchronized is sent to device 300 by device 200, and the electrovalves of control device 12 are de-energized. Before engine speed can change significantly, ratio change processing device 300 imposes the binary code for gear ratio n+x on control device 400, and sends an order to open the clutch to device 100, which causes the energization of electrovalve 10, causing jack 9 to open the clutch. When condition detector 500 detects that the gearbox is engaged in ratio n+x, it emits a binary coded representation of ratio n+x to ratio change processing device 300, which in turn emits an order to close the clutch to device 100, completing the gear change.

In a second hypothesis, it will be assumed that the driver of the vehicle wishes to accelerate at the maximum rate, and fully depresses the accelerator pedal, closing switch 7. The sequence of events above will occur as set forth above, except that ratio selecting device 200 will select the largest gear ratio consistent with the road speed and maximum acceptable engine speed of the vehicle rather than the smallest gear ratio consistent with the road speed of the vehicle and minimum acceptable engine speed. As the vehicle accelerates, engine speed will increase to the highest allowable engine speed so that device 100 will send a shift command to device 200 and ratio selecting device 200 will then initiate another gear ratio selection, selecting a gear ratio that is the highest that can be used without causing an excessive engine speed at the current road speed.

When the driver arrives at a desired road speed and chooses to stop accelerating at the maximum rate, and releases the accelerator pedal a sufficient amount to release switch 7, there will be no change in the selected gear until either the driver selects a gear ratio that will cause an acceptable engine speed at the existing road speed in semi-automatic mode, or until the vehicle decelerates to the extent that engine speed decreases to its lowest limit. Then, ratio selecting device 200 will select the smallest gear ratio possible without causing less than minimum engine speed at current road speed, for greatest operating economy.

It is this feature which constitutes one of the advances of the present invention over the prior art. In addition the prior art made no provision for use of the vehicle engine as a source of vehicle braking using a conventional gearbox. In the instant invention, a fleeting closure of switch 7, not causing vehicle acceleration, will engage the highest possible gear ratio, making maximum use of engine braking, and still avoid the possibility of damaging the engine by excessive rotational speed when used for braking.

In a third hypothesis, the vehicle is decelerating, and the engine speed has risen to the maximum allowable speed, which is the same speed as that chosen as a limit based on the engine's ability to produce acceptable torque above that speed. The sequence of events will proceed as set forth above, under the first hypothesis, except that automatic clutch control device 100, through sensors 4, 5, and 6, will cause the engine speed to increase after the step of placing the gearbox in neutral, rather than causing it to decrease, by means of a commercial comparator which determines the direction of change in engine speed necessary to make the output indications of sensors 4 and 5 equivalent.

In a fourth hypothesis, the vehicle is stationary when the driver selects either semi-automatic or automatic operation to put the vehicle in motion. If the vehicle has moved since the last time a gear ratio was engaged, the gearbox gears may be in such an angular position that they cannot be made to mesh. The instant invention incorporates ratio change processing device 300, which emits an impulse order to close the clutch to automatic clutch control device 100 if condition detector 500 does not indicate that the gearbox 1 has not been placed in the condition requested by the ratio imposed within a predetermined time, thereby changing the angular positions of the gears so that they can mesh.

With reference to FIG. 2, a gearbox 10 is of the type with a collective synchromesh 9. Said synchromesh 9 is interposed between the clutch 2 and the gearbox 10, and may be electric synchromesh with eddy-current brake. There are no individual synchromeshes inside the gearbox 10.

A synchronism detector 800 gives the processing device 300 the authorization of engaging the ratio when the synchronism is reached.

A circuit 700 for monitoring the collective synchromesh allows obtaining the synchronism by monitoring the engine 3, the clutch 2, or the eddy-current brake 9 (collective synchromesh).

The operation is as follows:

In a first hypothesis, it will be assumed that a higher ratio is set, so as to pass from the ratio n to the ratio n+1.

As soon as the processing device 300 emits the order of change of ratio, the following events take place:
  opening of the clutch 2;
  presence of the progression data (n→n+1);
  the synchronism detector 800 emits the data (0), as the code of the ratio imposed has just been changed at its input. As a result, an AND gate 702 receives a data (1) on its two inputs, as an inverter 701 inverts the data from the synchronism detector 800.

The opened gate 702 energizes the eddy-current brake 9 from the start of the ratio change cycle. The action of said brake 9 will be necessary and desirable only when the gearbox is in neutral. But the time required for generating the current in the collective brake 9 and the time required for passing to neutral have the same value, and, due to the special design of the device, it is possible to carry out simultaneously two operations which are mere losses of time. The change of ratio is thus shortened.

After the decelerating action of the brake 9 has brought the gears of the box 10 into synchronism, the synchronism detector 800 will emit a data (1) which produces the following effects:

authorization for the processing device 300 to engage the ratio imposed;

the gate 702 ceases to be open, due to the inverter 701 which applies (0) on one of the inputs of gate 702;

the brake of the synchromesh 9 is no longer energized. The sequence of the next events is the same as in the case of a gearbox with individual synchromeshes, as described with reference to FIG. 1.

In a second hypothesis, it will be assumed now that a lower ratio is set, so as to pass from a ratio n to a ratio n+1 or n−1.

The synchronism detector 800, for the same reasons as in the previous case, emits a data (0) which becomes (1) through inverter 701 and opens an AND gate 703 which receives through processing device 300 the "retrogradation" data (n−1).

At the beginning of the cycle, the clutch has been normally opened.

The information from gate 703 produces the following effects:

order of 4/4 or "flat out" for the engine through an OR gate 704;

order of closing of the clutch through an OR gate 705.

The order for closing the clutch has priority to the order for opening, according to a disposition of the device 100. The times required for passing to neutral, for closing the clutch, and for passing to 4/4 have about the same value, and, owing to the design of the system, do not add to the total duration of the operation.

After the engine has brought about the synchronism, the data (0) emitted by detector 800 becomes (1) through inverter 701, and the gate 703 ceases to be opened;

the clutch opens again;

the device 300 receives the authorization to engage the ratio selected;

the engine is no longer kept at 4/4 of load. The ratio change cycle ends normally.

The main advantages of the system according to the invention are as follows.

The synchronization devices are controlled in an "all-or-nothing" way, with an advance in time with respect to the action thereof which allows to conjugation of their time requirements for response with the durations of the mechanical coupling operations in the box which are absolutely necessary. Thus, idle periods of time are avoided. The gain in time is estimated to be 0.3 second.

Obtaining the synchronization through the engine takes about 0.5 second, while obtaining said synchronization through the brake 9 takes about 0.3 second.

The mechanical motions of the gearbox are estimated at 0.15 second;

The normal time for a known change of ratio ranges from 0.8 to 1.2 second. The device described hereinabove reduces said times to about from 0.45 to 0.65 second;

The present invention does not include any wearing parts, and allows reduction of the size of the gearbox casings, or else, building in the same casing a gearbox more robust than if individual synchromeshes were used.

There is herein incorporated by reference thereto the following commonly-assigned copending disclosures: U.S. patent application, Ser. No. 479,537 filed June 14, 1974 naming Jean-Paul Sibeud as inventor, and entitled "DEVICE WITH A JACK FOR CONTROLLING A GEARBOX SYNCHROMESH, AND METHOD FOR USING SAME"; U.S. Pat. No. 3,943,792 issued Mar. 16, 1976 naming Jean-Paul Sibeud as inventor, and entitled "METHOD AND DEVICE FOR ASCERTAINING THE STATE OF A GEARBOX, IN PARTICULAR IN A MOTOR VEHICLE"; U.S. patent application, Ser. No. 469,232 filed May 13, 1974 naming Jean-Paul Sibeud as inventor, and entitled "AUTOMATIC CLUTCH DEVICE FOR MOTOR VEHICLES"; U.S. Pat. No. 4,140,031 issued Feb. 20, 1979 naming Jean-Paul Sibeud and Jean-Marie Noyer as inventors, and entitled "DEVICE FOR CHANGING THE GEARS AUTOMATICALLY ON A SYNCHRONIZED GEARBOX"; U.S. Pat. No. 4,079,638 filed Mar. 24, 1975 naming Jean-Paul Sibeud as inventor, and entitled "DEVICE FOR THE AUTOMATIC OR MANUAL SELECTION OF THE RATIO OF A GEARBOX ON A MOTOR VEHICLE". The disclosures of all of the aforementioned applications are hereby incorporated herein by reference thereto.

I claim:

1. A method for controlling a gearbox with a plurality of gear ratios provided with dogs, on a vehicle which includes, an engine, a clutch, means for opening and closing said clutch, gearbox control means, gearbox condition detector means, memory means, ratio selection means, means for determining rotational speeds of input and output shafts of said gearbox, engine speed control means, means for determining the speed of said engine, means for determing the acceleration of said vehicle, and means including controls for effecting a sequence of operations, which operations are carried out automatically and including electrical and electronic circuits which operate as loop chains, comprising:

(a) opening the clutch;

(b) putting said gearbox into neutral, by means of said gearbox control means;

(c) selecting the largest gear ratio n' of more than one gear ratios useable at the existing speed of said vehicle;

(d) memorizing by said memory means an electrical binary code representing said selected gear ratio n', and simultaneously memorizing by said memory means data representing the character of a change in gear ratios;

(e) using said gearbox control device to place said gearbox into said selected gear ratio n';

(f) simultaneously closing said clutch;

(g) using said gearbox condition detector to determine whether the gearbox is in said selected gear ratio n', with the dogs of gear ratio n' meshed together;

(h) comparing selected gear ratio n' with the condition of said gearbox as determined by said gearbox condition detector to determine whether said condition is equivalent to said selected gear ratio; and (i) if said condition is equivalent to said selected gear ratio, cancelling said date memorized in said memory means to prepare for a new cycle.

2. A method according to claim 1, wherein, the selection of a new gear ratio is made:
on the initiative of a ratio selecting device, upon change in output of said engine.

3. A method according to claim 1 for the control of a gearbox provided with individual synchromeshes, including the steps of:
(a) closing said clutch after said gearbox condition detector means indicates that said gearbox is in neutral;
(b) adjusting the speed of said engine using said engine speed control device to cause the rotational speeds of input and output shafts of said gearbox to become related by a predetermined ratio; and
(c) opening said clutch before using said gearbox control device to cause said gearbox to be placed into said selected gear ratio n'.

4. A method according to claim 1, including the steps of:
selecting upper and lower engine speed limits and causing memorization thereof by said memory means;
monitoring the engine speed with at least one of said means;
predicting the engine speed under said selected ratio n' with at least one of said means; and
proceeding with a change of ratio to said selected ratio n' only if the predicted engine speed is within said upper and lower engine speed limits.

5. A method according to claim 1, wherein the selection of said gear ratio n' is made manually.

6. A method according to claim 1, wherein:
the selection of new gear ratio n' is made by depressing an accelerator.

7. A method according to claim 6, including:
depressing said accelerator rapidly into fully depressed position and thereby transmitting an order to select the highest ratio useable at a given vehicle speed as said ratio n';
causing memorization of the latter said ratio n'; and
thereafter placing said gearbox in the latter said selected ratio n'.

8. A method according to either one of claims 6 or 7, including:
retaining said gearbox in the gear ratio n' on full release of said accelerator to effect breaking action of said engine.

9. A method according to any one of claims 6 or 7, including:
changing to a different ratio n' when the acceleration of said vehicle exceeds a predetermined limit.

10. A method according to anyone of claims 6 or 7, including:
changing to a different ratio n' when the speed of said engine reaches anyone of predetermined points on an engine speed cut-off curve.

11. A method according to claim 10, wherein:
one of said predetermined points on said cut-off curve lies substantially in the middle of said curve.

12. A method according to claim 1, for the control of a gearbox provided with collective synchromesh, including:
the steps of when said clutch is open and said engine is in neutral, operating said synchromesh to cause rotational speeds of input and output shafts of said gearbox to become related by a predetermined ratio;
utilizing a synchronism detector to determine when said shafts are in said related ratio; and
thereafter proceeding with placing said gearbox in said ratio n'.

13. An apparatus for controlling a gearbox with a plurality of gear ratios provided with dogs, on a vehicle which includes, an engine, a clutch, means for determining rotational speeds of input and output shafts of said gearbox, engine speed control means, means for determining the speed of said engine, means for determining the acceleration of the vehicle having said gearbox, and means including controls for automatically carrying out a sequence of operations including electrical and electronic circuits which operate as loop chains, said means including controls further comprising:
(a) means for opening and closing the clutch;
(b) a gearbox control device for putting said gearbox into neutral;
(c) a ratio selection means for selecting the largest gear ratio n' of more than one gear ratio useable at the existing speed of said vehicle, n';
(d) a memory means adapted to memorize an electrical binary code representing said selected gear ratio n', and to simultaneously memorize data representing the character of a change in gear ratio;
(e) a gearbox control device adapted to place said gearbox into said selected ratio n';
(f) a gearbox condition detector adapted to determine whether the gearbox is in said selected ratio n', with the dogs of the gear ratio n' meshed together;
(g) means for comparing the selected gear ratio n' with the condition of said gearbox as determined by said gearbox condition detector to determine whether said condition is equivalent to said selected gear ratio n'; and
(h) means for cancelling said data memorized in said memory means to prepare for a new cycle.

14. An apparatus according to claim 13, further comprising:
means for selecting said gear ratio n' at the beginning of a cycle manually by the driver of a vehicle.

15. An apparatus according to claim 13 including means rendering said apparatus useful for the control of a gearbox provided with individual synchromeshes, comprising:
(a) means for closing said clutch after said gearbox condition detector means indicates that said gearbox is in neutral;
(b) said engine speed control device being adapted to control the speed of said engine to cause the rotational speeds of input and output shafts of said gearbox to become related by a predetermined ratio; and
(c) means for opening said clutch before using said gearbox control device to cause said gearbox to be placed into said ratio n'.

16. An apparatus according to claim 13, including:
means for predicting engine speeds under a selected ratio n' prior to placing said gearbox into said selected ratio n'; and means for restraining said gearbox control device from placing said gearbox in said selected said ratio n' if the predicted engine speed is not within upper and lower engine speed limits, preselected and memorized by said memory means.

17. An apparatus according to claim 13, including:
means for selecting said new gear ratio n' automatically on the initiative of said ratio selecting device.

18. An apparatus according to claim 13, including:
an accelerator means for said engine operable to cause said ratio selection means for selecting a gear ratio to function.

19. An apparatus according to claim 18, including:
means operable upon depressing of said accelerator to order the selection of the highest ratio useable at any given vehicle speed as the ratio n' and to cause placement of said gearbox into the latter said ratio n'.

20. An apparatus according to anyone of claims 18 or 19, including:
means for retaining said gearbox in the selected ratio n' upon release of said accelerator to effect breaking action by said engine.

21. An apparatus according to claim 19 including:
means for changing the ratio of said gearbox to a different ratio n' when the speed of said engine reaches anyone of predetermined points on a speed torque curve of said engine.

22. An apparatus according to claim 21, including:
means for changing the selection of the ratio n' when the speed of said engine reaches a midpoint on the torque-speed curve.

* * * * *